United States Patent
Gokturk et al.

(10) Patent No.: US 6,695,070 B1
(45) Date of Patent: Feb. 24, 2004

(54) MAGNETIC IMPACT DEVICE AND METHOD FOR MAGNETICALLY GENERATING IMPACT MOTION

(75) Inventors: Halit S. Gokturk, Mountain View, CA (US); Yoshihiro Sakamoto, Hikone (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 10/211,539

(22) Filed: Aug. 5, 2002

(51) Int. Cl.[7] .............................................. B25D 13/00
(52) U.S. Cl. ......................... 173/1; 173/114; 173/117
(58) Field of Search ............................ 173/1, 49, 93, 173/93.5, 114, 117; 310/12, 14, 23

(56) References Cited

U.S. PATENT DOCUMENTS

| | | | | |
|---|---|---|---|---|
| 519,662 A | * | 5/1894 | Carpenter ................... | 173/117 |
| 2,635,854 A | * | 4/1953 | Richards et al. ............ | 173/117 |
| 2,861,778 A | * | 11/1958 | Spurlin ....................... | 173/117 |
| 2,949,909 A | * | 8/1960 | Macchioni et al. ......... | 173/117 |
| 3,811,313 A | * | 5/1974 | Schut .......................... | 72/430 |
| 4,468,594 A | * | 8/1984 | Jacquemet .................. | 318/130 |
| 5,497,555 A | * | 3/1996 | Averbukh .................... | 30/362 |

\* cited by examiner

*Primary Examiner*—Scott A. Smith
*Assistant Examiner*—Chukwurah Nathaniel
(74) *Attorney, Agent, or Firm*—Oblon, Spivak, McClelland, Maier & Neustadt, P.C.

(57) ABSTRACT

A magnetic impact device includes at least one hammer relatively movable with respect to at least one chuck. One of the at least one hammer and the at least one chuck has at least one magnet. Another of the at least one hammer and the at least one chuck has at least one magnet or magnetic material. A driving unit is configured to move the at least one hammer relatively to the at least one chuck to magnetically generate impact motion of the at least one chuck.

51 Claims, 10 Drawing Sheets

MAGNETIC IMPACT DEVICE AND METHOD FOR MAGNETICALLY GENERATING IMPACT MOTION

BACKGROUND OF THE INVENTION

1. Field of the Invention

The present invention relates to a magnetic impact device, a power tool having the magnetic impact device and a magnetic impact generator. The present invention further relates to a method for magnetically generating impact motion.

2. Discussion of the Background

Portable power tools used for drilling, fastening and the like are expected to be relatively small and light, yet provide high power to perform the functions. Referring to FIG. 1, the tool is typically driven by an electric motor 110. The rotational motion of the motor 110 is transmitted to a chuck 160 which holds a tool bit 115 by means of an intermediate mechanism 120. The motor 110 is generally small due to restrictions imposed on overall size and weight of the portable power tools. Limited power of the small motor might not be enough to drive the intended load. A hammer type of mechanism 120 is introduced to respond to the need to generate high output torque from a small drive.

Referring to FIG. 2, the hammer type of mechanism 120 is rotated by the motor 110. The hammer type of mechanism 120 includes hammers (120a and 120b). The hammer type of mechanism 120 stores the rotational energy of the motor 110 over a large angle of rotation, for example, half turn (180°). Then the hammers (120a and 120b) hit the chuck 160 to create an impact torque over a small angle (for example 10°) of rotation of the chuck 160. In this portable power tool, noise is made when the hammers (120a and 120b) hit the chucks 160.

SUMMARY OF THE INVENTION

According to one aspect of the present invention, a magnetic impact device includes at least one chuck, at least one hammer and a driving unit. The at least one hammer is relatively movable with respect to the at least one chuck. One of the at least one hammer and the at least one chuck has at least one magnet. Another of the at least one hammer and the at least one chuck has at least one magnet or magnetic material. The driving unit is configured to move the at least one hammer relatively to the at least one chuck to magnetically generate impact motion of the at least one chuck.

According to another aspect of the present invention, a power tool includes a magnetic impact device. The magnetic impact device includes at least one chuck, at least one hammer and a driving unit. The at least one hammer is relatively movable with respect to the at least one chuck. One of the at least one hammer and the at least one chuck has at least one magnet. Another of the at least one hammer and the at least one chuck has at least one magnet or magnetic material. The driving unit is configured to move the at least one hammer relatively to the at least one chuck to magnetically generate impact motion of the at least one chuck.

According to further aspect of the present invention, a power tool magnetic impact generator includes at least one chuck and at least one hammer. One of the at least one hammer and the at least one chuck has at least one magnet. Another of the at least one hammer and the at least one chuck has at least one magnet or magnetic material. The at least one hammer is configured to be moved relatively to the at least one chuck to magnetically generate impact motion of the at least one chuck.

According to further aspect of the present invention, a method for magnetically generating impact motion includes providing at least one chuck and providing at least one hammer. One of the at least one hammer and the at least one chuck is provided with at least one magnet. Another of the at least one hammer and at least one chuck is provided with at least one magnet or magnetic material. The at least one hammer is moved relatively to the at least one chuck to magnetically generate impact motion of the at least one chuck.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 2:
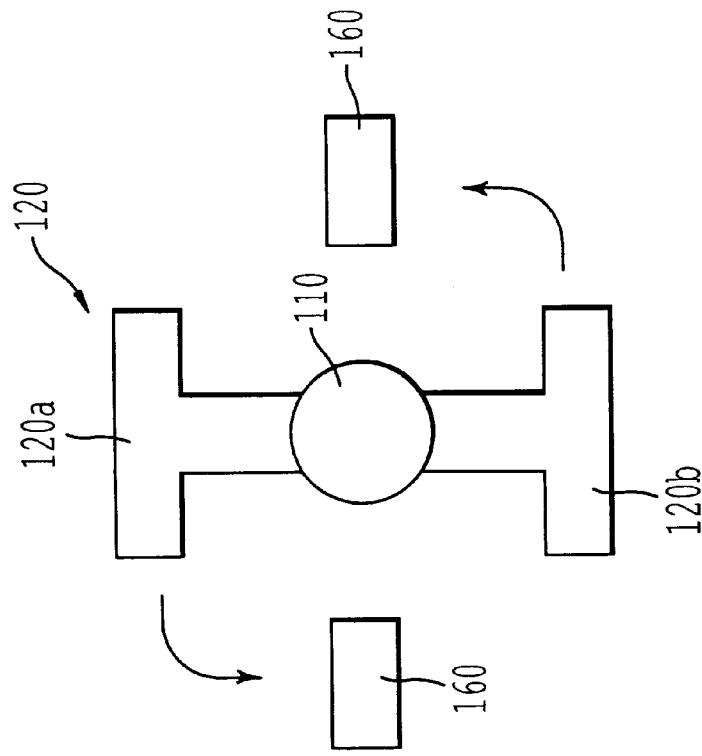
FIG. 2 is a schematic top plan view of a hammer type impact generator of background art.
Figure 1:
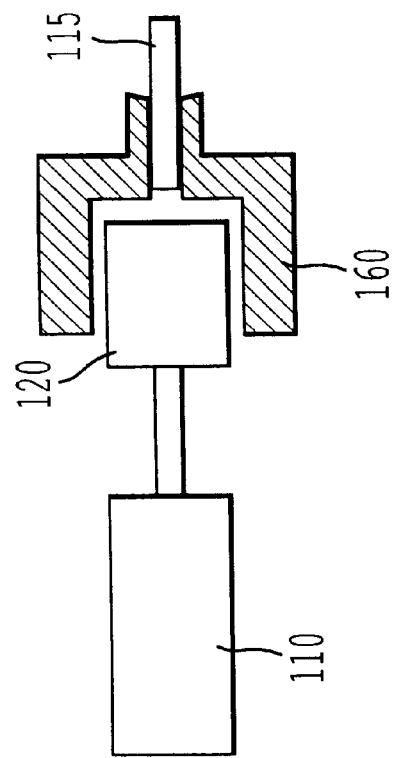
FIG. 1 is a cross sectional view of a portable power tool of background art.

The embodiments will now be described with reference to the accompanying drawings, wherein like reference numerals designate corresponding or identical elements throughout the various drawings.

Figure 3:
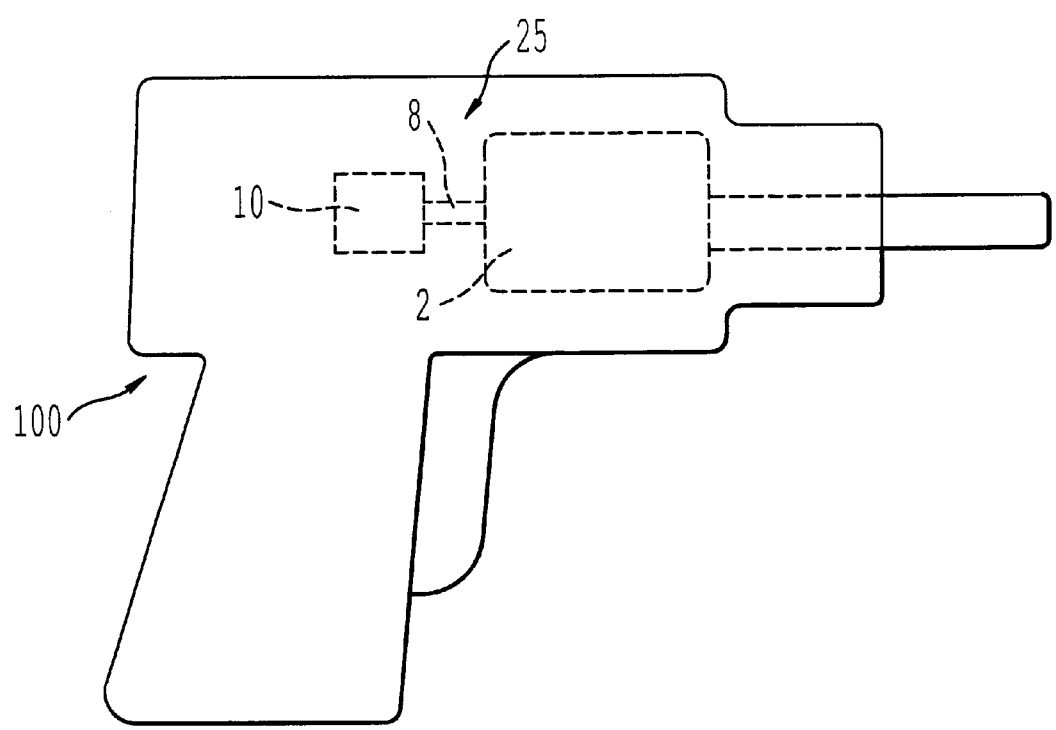
FIG. 3 is a schematic side view of a portable power tool according to an embodiment of the present invention.

Referring to FIG. 3, a portable power tool 100 used for drilling, fastening and the like includes a magnetic impact device 25. The magnetic impact device 25 includes an impact generator 2, a motor 10 and a shaft 8 which connects the impact generator 2 and the motor 10. The magnetic impact device 25 is configured to generate an impact motion. The portable power tool 100 includes, for example, an impact driver and the like.

Figure 4:
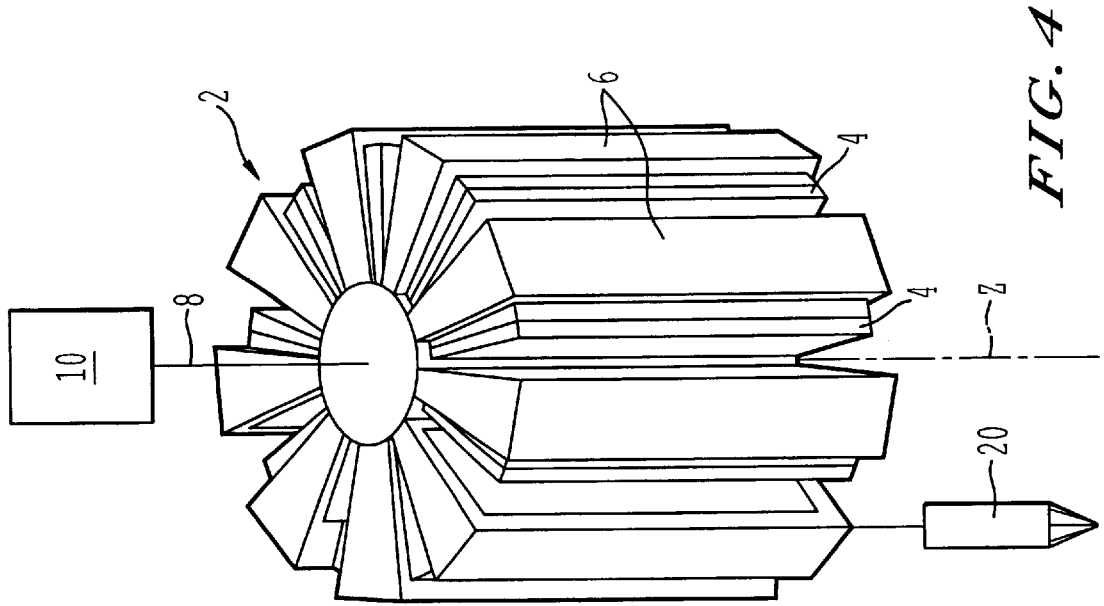
FIG. 4 is a perspective view of a magnetic impact device according to an embodiment of the present invention.
Figure 5:
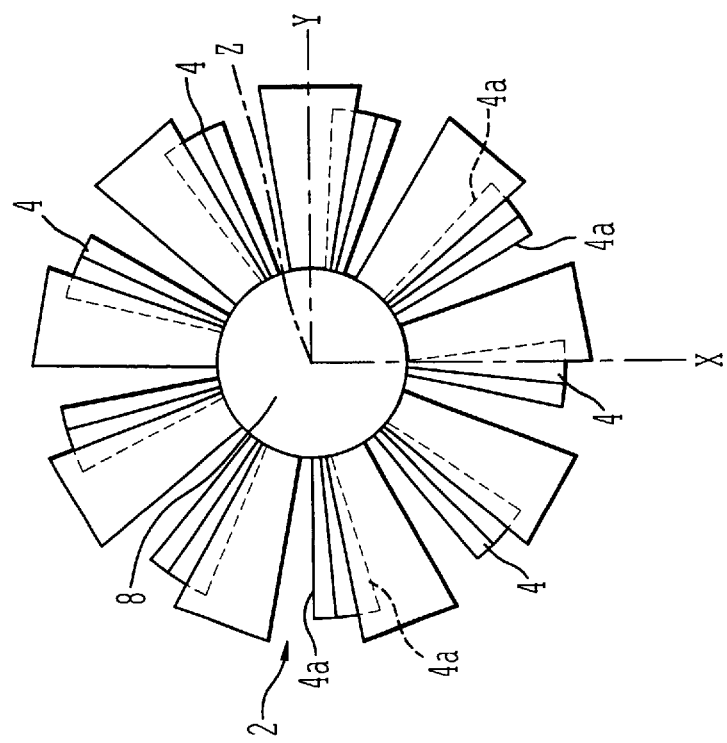
FIG. 5 is a schematic top plan view of the magnetic impact device according to the embodiment of the present invention.

Referring to FIGS. 4 and 5, the impact generator 2 includes at least one hammer 4 and at least one chuck 6. In this embodiment, the impact generator 2 includes a plurality of hammers 4 and a plurality of chucks 6. The hammer 4 is, for example, a solid plate. The chuck 6 is, for example, a frame which can accommodate the hammer 4 within the frame. The hammers 4 are connected to a circumferential surface of the shaft 8, for example, with substantially equal angular space ($\theta hs$) (see FIG. 7). The shaft 8 is rotatable around an axis Z of the shaft 8 which is perpendicular to an X-Y plane. In FIGS. 4 and 5, the impact generator 2 includes, for example, nine hammers 4. The hammer 4 has both side faces (4a) which extend from the axis Z and are substantially perpendicular to the X-Y plane. The hammer 4 has, for example, a substantially fan-shaped cross section taken along the X-Y plane.

Figure 7:
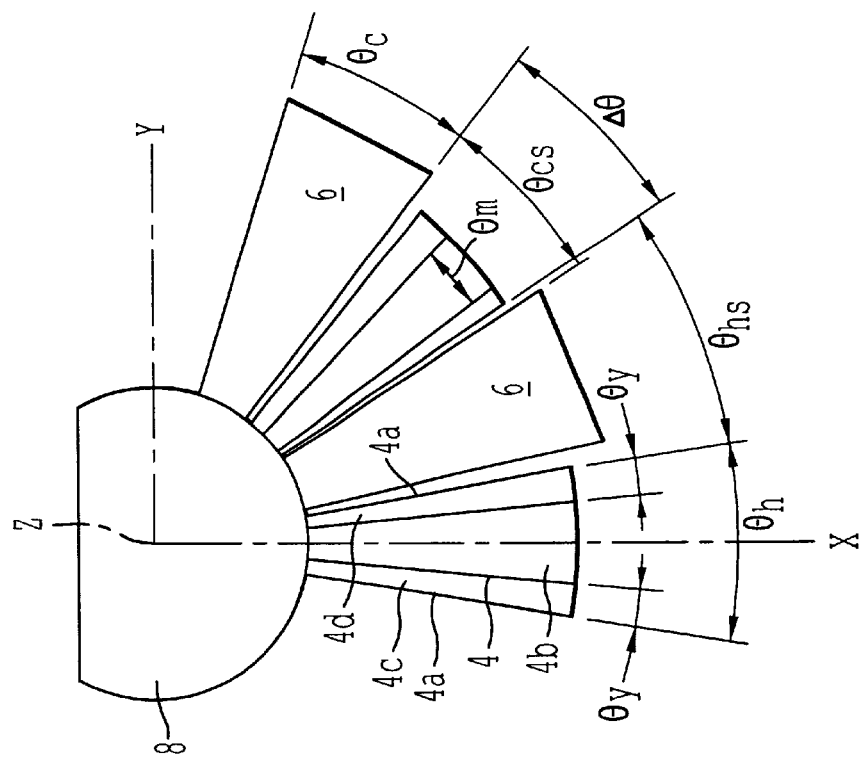
FIG. 7 is a top plan view of the impact generator according to the embodiment of the present invention.

Referring to FIGS. 4, 5 and 7, in the present embodiment, a central angle ($\theta h$) of the hammer 4 between the side faces (4a) is, for example, about 20°. The angular space ($\theta hs$) between the hammers 4 is, for example, substantially equal to the central angle ($\theta h$) of the hammer 4, i.e., about 20°. However, the angular space ($\theta hs$) between the hammers 4 may be different from the central angle ($\theta h$) of the hammer 4. The shaft 8 is connected to the motor 10. Accordingly, the motor 10 rotates the hammers 4 via the shaft 8. The chuck 6 is connected to a tool, for example, a driver 20 to rotate screws by impact rotational force.

The chucks 6 are provided to be coaxial with the hammers 4 and to be relatively rotatable with respect to the hammers 4 around the shaft 8. The chucks 6 are made of soft magnetic material of high permeability. The chucks 6 are provided around the shaft 8, for example, with substantially equal angular space. In FIGS. 4 and 5, the impact generator 2 includes, for example, nine chucks 6. Although the number of the hammers 4 are the same as that of the chucks 6 in the present embodiment, these numbers may be different. The chuck 6 is, for example, substantially trapezoidal in a top plan view (see FIG. 5). The chuck 6 may have a substantially fan-shaped form in the top plan view.

In the present embodiment, a central angle ($\theta c$) of the chuck 6 is, for example, about 20°. The angular space ($\theta cs$) between the chucks 6 is, for example, substantially equal to the central angle ($\theta c$) of the chuck 6, i.e., about 20°. However, the angular space ($\theta cs$) between the chucks 6 may be different from the central angle ($\theta c$) of the chuck 6. Further, the angular space ($\theta cs$) between the chucks 6 and the central angle ($\theta c$) of the chuck 6 may be different from the angular space ($\theta hs$) between the hammers 4 and the central angle ($\theta h$) of the hammer 4, respectively.

Figure 6:
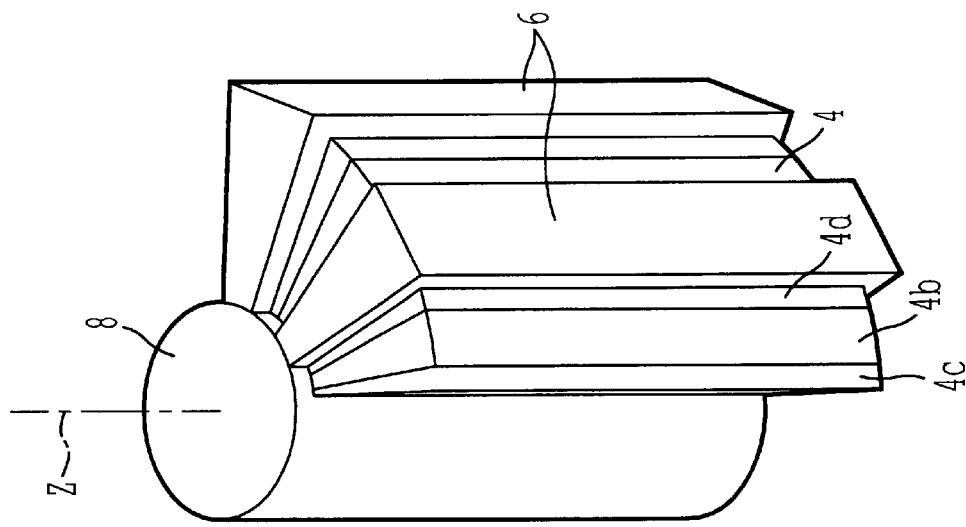
FIG. 6 is a perspective view of an impact generator according to the embodiment of the present invention.

FIGS. 6 and 7 show the impact generator 2. Only two hammers 4 and two chucks 6 are illustrated in order to simplify the drawings. Referring to FIGS. 6 and 7, the hammer 4 includes first and second yokes (4c and 4d) and a permanent magnet (4b) which is sandwiched between the first and second yokes (4c and 4d). The permanent magnet (4b) is connected to the shaft 8 and radially extends from the shaft 8. The first and second yokes (4c and 4d) are made of soft magnetic material of high permeability. The function of the first and second yokes (4c and 4d) is to collect the magnetic field emanated by the permanent magnet (4b) and to direct the magnetic field to the chucks 6. The outer circumferences of the permanent magnet (4b) and the first and second yokes (4c and 4d) are arc-shaped in the X-Y plane. The central angle ($\theta m$) of the arc of the permanent magnet (4b) is, for example, about 10°. The central angle ($\theta y$) of the arc of each of the first and second yokes (4c and 4d) is, for example, about 5°. The cross section of the hammer 4 taken along the plane including the axis Z may be substantially rectangular. The air gap between the hammer 4 and the chuck 6 is, for example, about 0.25 mm. It is preferable that the air gap is as small as possible.

Figure 8:
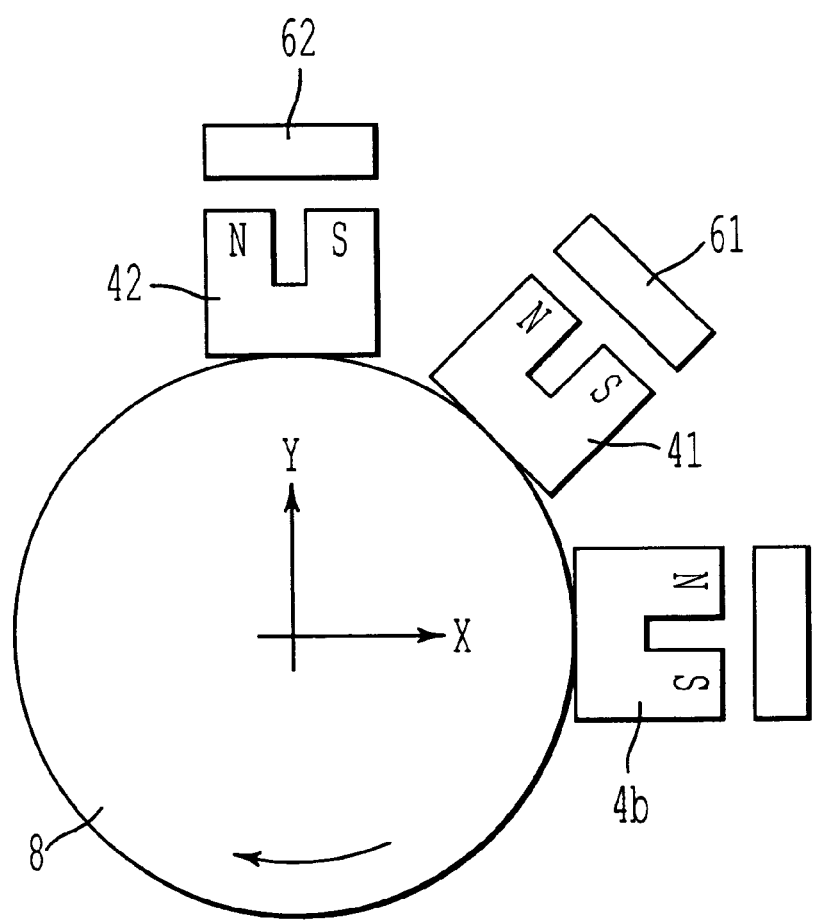
FIG. 8 is a schematic top plan view of the impact generator according to the embodiment of the present invention.

Referring to FIG. 8, a magnetization direction of the permanent magnet (4b) is along the circumferential direction of the shaft 8. As shown in FIG. 8, the hammers 4 are provided such that N-pole and S-pole of the permanent magnet (4b) are alternatively positioned.

Figure 9A:
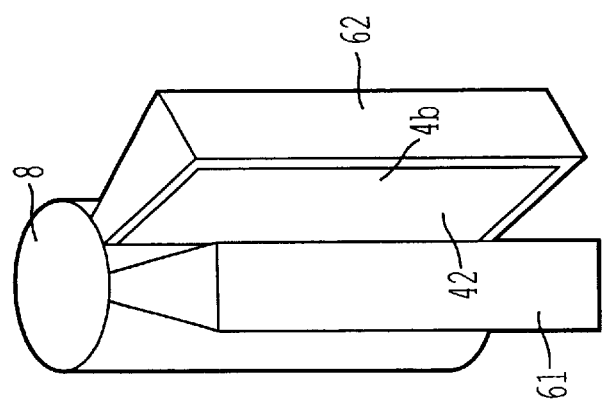
FIGS. 9(a)–9(c) are explanatory illustrations for explaining an operation of the magnetic impact device according to the embodiment of the present invention.
Figure 9B:
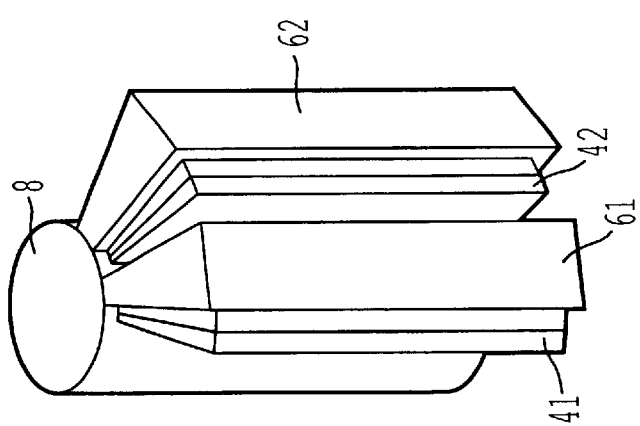
Figure 9C:
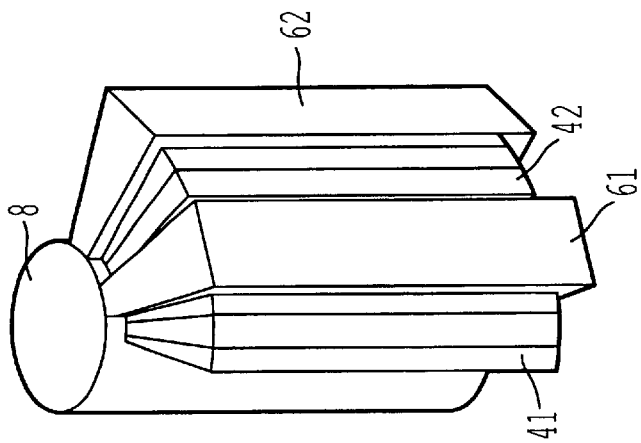
Figure 10A:
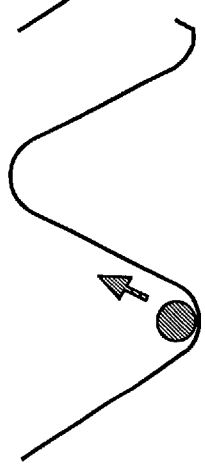
FIGS. 10(a)–10(c) are explanatory illustrations for explaining an operation of the magnetic impact device according to the embodiment of the present invention using a mechanical analogy of a ball rolling on a curved surface under an influence of gravity.
Figure 10B:
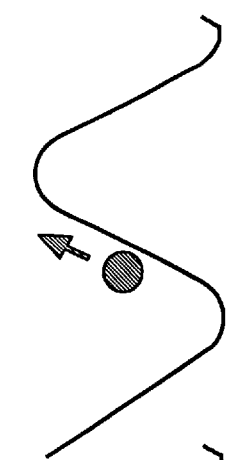
Figure 10C:
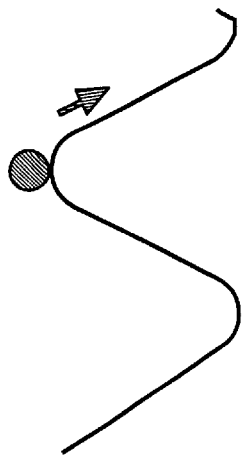

Referring to FIGS. 8, 9(a)–9(c) and 10(a)–10(c), the operation of the magnetic impact device 25 will be explained. In these figures, hammers 41 and 42 among the hammers 4 and chucks 61 and 62 among the chucks 6 are illustrated to simplify the explanation. FIGS. 10(a)–10(c) shows a simple mechanical analogy of a ball rolling on a curved surface under the influence of gravity. Referring to FIG. 9(a), the shifting angle ($\Delta\theta$) (see FIG. 7) formed between the hammer 42 and the chuck 62 is equal to zero. Namely, the chuck 62 substantially completely accommodates the hammer 42 therein. At this angle, magnetic field lines emanating from the hammer 42 travel through the soft magnetic material of the corresponding chuck 62 to complete the magnetic circuit. Accordingly, the hammer 42 is at stable equilibrium, being attracted strongly to the chuck 62. Magnetic energy stored in the permanent magnet (4b) (or alternatively in the air gap) is at its minimum. Referring to FIG. 10(a), this situation is similar to the situation in which the ball locates at the bottom portion of the curved surface. In this situation, potential energy of the ball is minimum.

Referring to FIG. 9(b), if the hammer 42 is rotated (for example in the clockwise direction), the chuck 62 feels a pull towards the hammer 42 due to magnetic attraction. If the chucks 6 cannot be rotated by the hammer 4 because the load of the chucks 6 is larger than the rotational torque, energy provided by the motor 10 begins to accumulate as magnetic energy as the shifting angle ($\Delta\theta$) increases. Referring to FIG. 10(b), this situation is similar to the situation in which the ball goes up the slope of the curved surface so that potential energy of the ball increases.

Referring to FIG. 9(c), at the shifting angle ($\Delta\theta$) of 180°/n, for example, 20°, the hammer 42 is midway between two consecutive chucks (61 and 62), wherein "n" represents the number of the hammers or the chucks. At this angle the hammer 42 is at unstable equilibrium. Referring to FIG. 10(c), this situation is similar to the situation in which the ball locates at the top of the curved surface. The potential energy of the ball is maximum.

Returning to FIG. 9(c), a small rotation of the hammer 42 in the clockwise direction makes the hammer 42 get attracted magnetically towards the forward chuck 61. Under the torque of magnetic attraction, the hammer 42 accelerates towards the forward chuck 61, i.e., the next stable equilibrium point, dissipating the stored magnetic energy. With adequate angular momentum, the hammer 42 goes past the forward chuck 61 (the equilibrium point) and exerts a momentary attractive torque on the forward chuck 61 in the clockwise direction. This torque is the impact torque generated magnetically in a non-contact manner. Namely, magnetic energy stored while the hammer 42 is trying to escape the attraction of one chuck 62 is used to generate an impact to the next chuck 61.

The magnetic field necessary for generating the impact is provided by the permanent magnet. Magnetic energy stored and transmitted for generating the impact corresponds to the change of internal energy of the permanent magnet. Minimum internal energy of the permanent magnet is zero. Maximum internal energy of the permanent magnet is limited by the remanence (Br) and volume fraction of the permanent magnet in the total volume. Given those parameters, one can estimate maximum magnetic energy variation available for generating an impact. In the present embodiment, for example, the remanence (Br) is about 1.2 tesla, volume fraction of the magnet is about 0. 18. In this case, the estimated maximum energy variation is about 4.4J.

Figure 11:
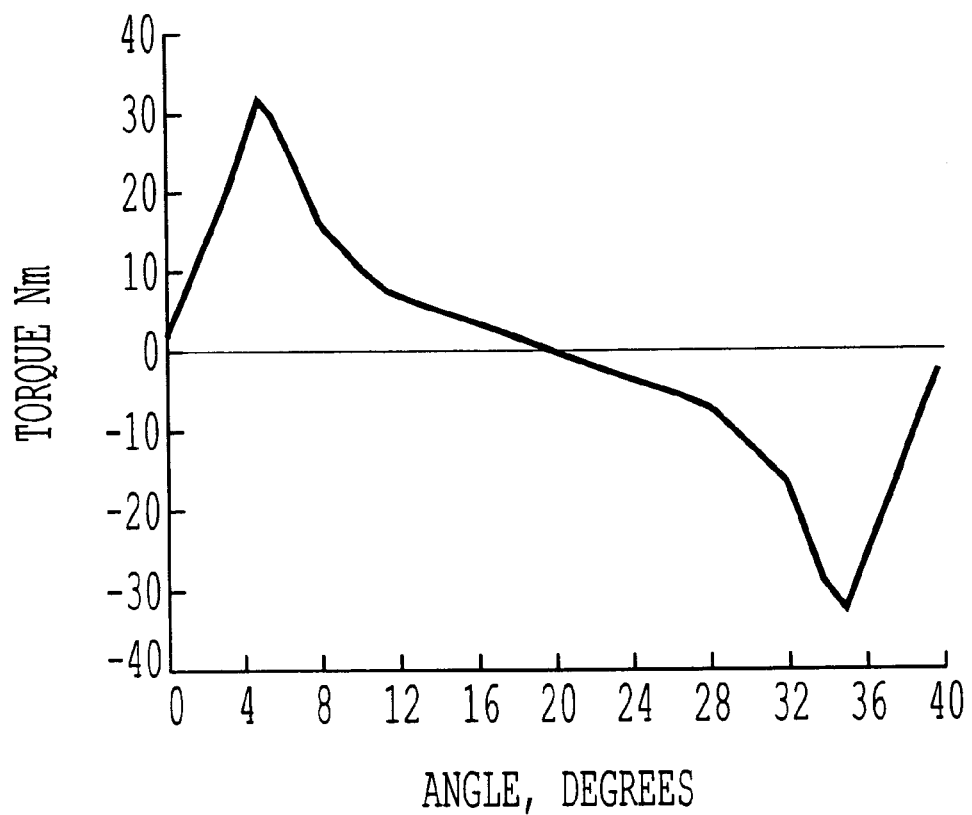
FIG. 11 shows results of magnetic field simulation of the magnetic impact device according to the embodiment of the present invention.

Results of the magnetic field simulation of the magnetic impact device 25 shown in FIGS. 4 and 5 are given in FIG. 11. Magnetic torque generated between the hammers 4 and the chucks 6 changes in a substantially triangular fashion from zero to peak value to zero as the shifting angle ($\Delta\theta$) changes from 0° to 180°/n. Integral of the torque over the angle 0° to 180°/n (area underneath the torque curve) is approximately equal to the energy variation mentioned above. Given a target peak torque to achieve and maximum energy variation, one can determine the numbers (n) of hammers and chucks considering maximum dimensions of the impact generator (for example, the diameter is about 60 mm and the length is about 60 mm). In the present embodiment, the maximum energy variation is 4.4 (J), target peak torque is 30 (Nm). Accordingly, the number (n) is equal to approximately 9.

Torque increases as the radius at which the magnetic interaction between the hammers 4 and the chucks 6 occurs. In the impact generator 2 shown in FIGS. 4 and 5, for example, a radius of the hammer 4 is determined as large as possible (for example, 27.5 mm) within the limits like maximum radius (30 mm) of the device and maximum magnetic field allowable in the soft magnetic material (about 2 tesla).

In the magnetic impact device 25 according to the present embodiment of the present invention, impact noise associated with mechanical hammer impact device may reduce.

Figure 12:
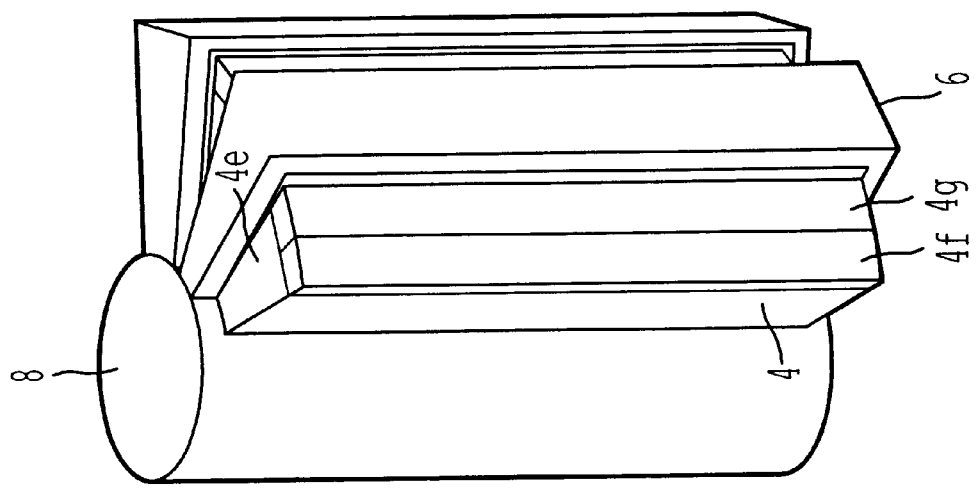
FIG. 12 is a perspective view of an impact generator according to another embodiment of the present invention.
Figure 13:
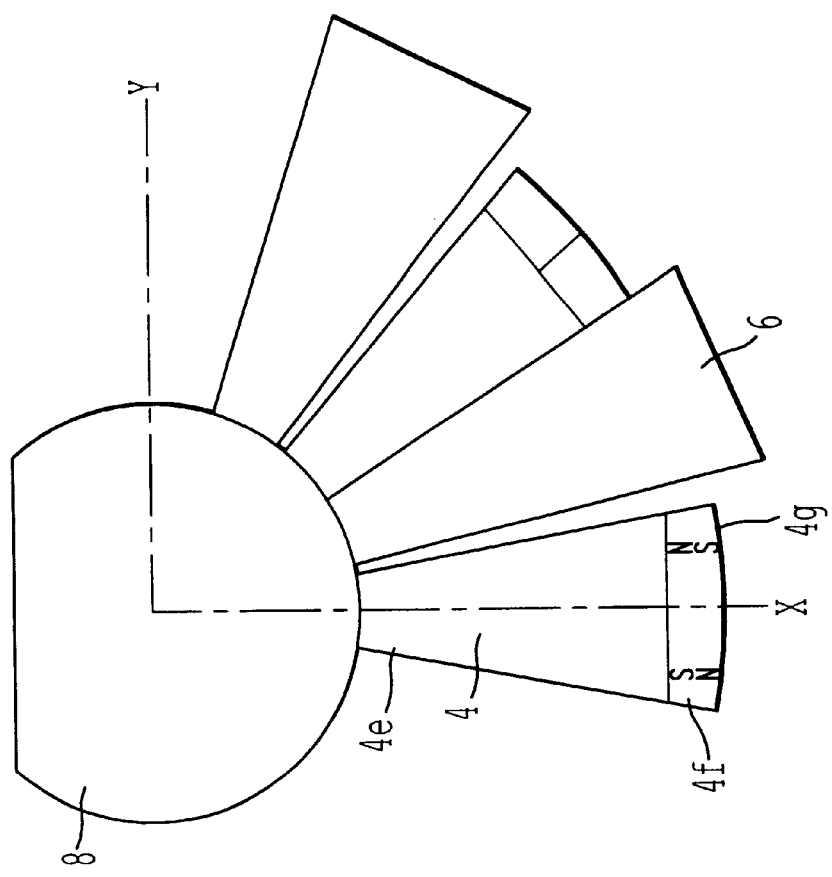
FIG. 13 is a top plan view of the impact generator according to the another embodiment of the present invention.

In the magnetic impact device 25 as shown in FIGS. 4–7, the permanent magnet (4b) is connected to the shaft 8 and radially extends from the shaft 8. Further, as shown in FIG. 8, a magnetization direction of the permanent magnet (4b) is along the circumferential direction of the shaft 8. However, as shown in FIGS. 12 and 13, the hammer 4 may include a yoke (4e) and first and second permanent magnets (4f and 4g). Referring to FIGS. 12 and 13, the yoke (4e) is connected to the shaft 8. The first and second permanent magnets (4f and 4g) are provided on the outer circumferential surface of the yoke (4e) such that the first permanent magnet (4f) is positioned forward with respect to the second permanent magnet (4g) in the clockwise rotational direction. The first and second permanent magnets (4f and 4g) are magnetized in radial direction. The magnetization direction of the first permanent magnet (4f) is opposite to that of the second permanent magnet (4g) (see FIG. 13).

Figure 14:
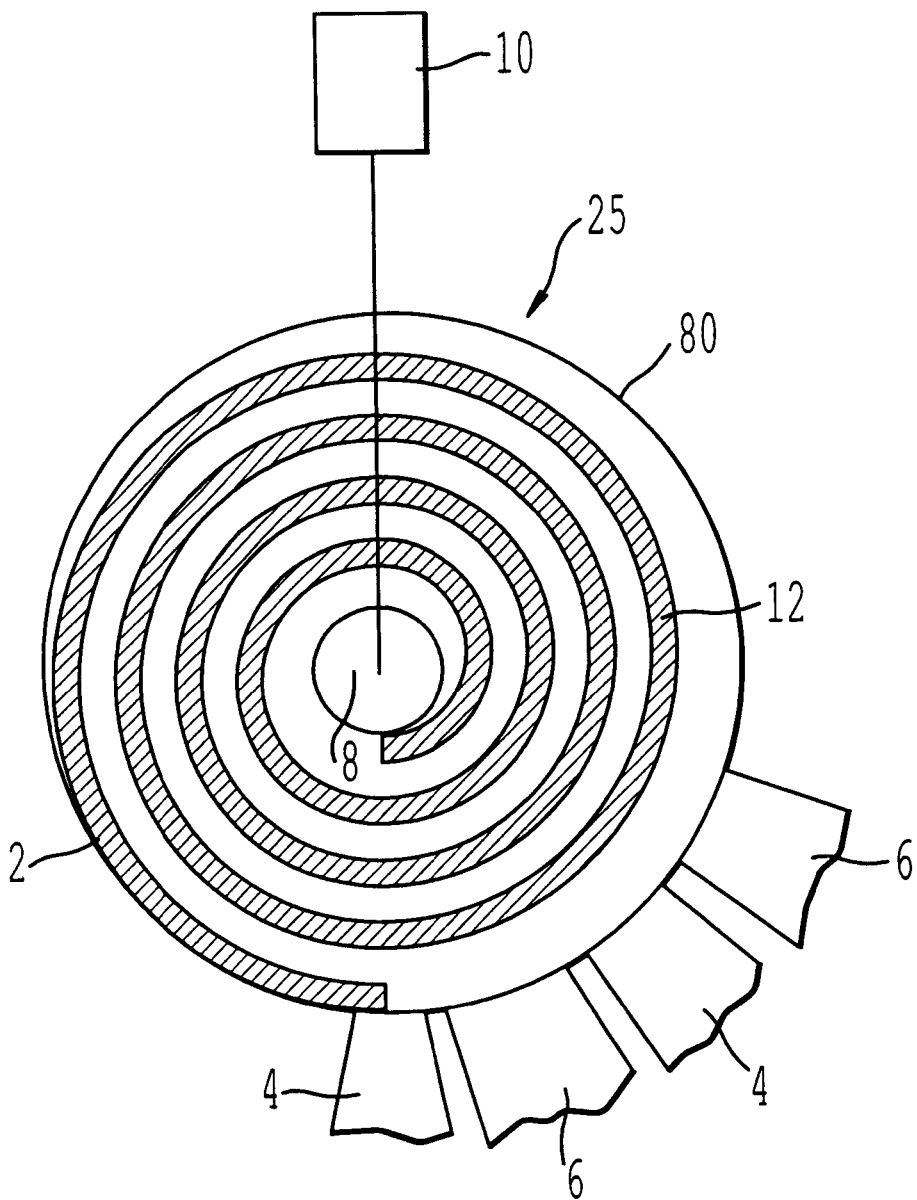
FIG. 14 is a top plan view of a portion of an impact generator according to yet another embodiment of the present invention.

FIG. 14 is a top plan view of a portion of the magnetic impact device 25 according to another embodiment of the present invention. Referring to FIG. 14, the shaft 8 is coaxially provided in a cylindrical shaft 80. The outer circumference of the shaft 8 is connected to the cylindrical shaft 80 via a mechanical spring 12. The hammers 4 are connected to an outer circumferential surface of the cylindrical shaft 80, for example, with substantially equal angular space. The chucks 6 are provided to be coaxial with the hammers 4 and to be relatively rotatable with respect to the hammers 4 around the cylindrical shaft 80.

In the embodiment as shown in FIG. 4, the electric motor 10 rotates the hammers 4. Generally, this electric motor 10 is small. Since such a motor generates relatively low torque, it would be difficult to store enough energy in the air gap over the shifting angle ($\Delta\theta$) of 180°/n.

In the magnetic impact device 25 shown in FIG. 14, the energy to be stored in the air gap may increase, because the mechanical spring 12 is provided between the motor 10 and the hammer 4 as shown in FIG. 14. Namely, the spring 12 elastically deforms to store energy therein when the motor rotates the shaft 8. The torque of the shaft 8 is amplified and transmitted to the cylindrical shaft 80 via the spring 12. Accordingly, even though the output torque of the motor 10 is small, the motor 10 can rotate the hammers 4 against the magnetic force between the hammers 4 and the chucks 6. The spring 12 is chosen such that motor energy stored over a large angle of rotation of the motor (for example 180°) is equal to the peak energy stored over the small angle of 180°/n (for example 20°).

In the above described embodiments according to the present invention, the chuck 6 has a frame shape inside of which the hammer 4 passes through. However, the hammer may have a frame shape inside of which the chuck passes through.

Figure 15:
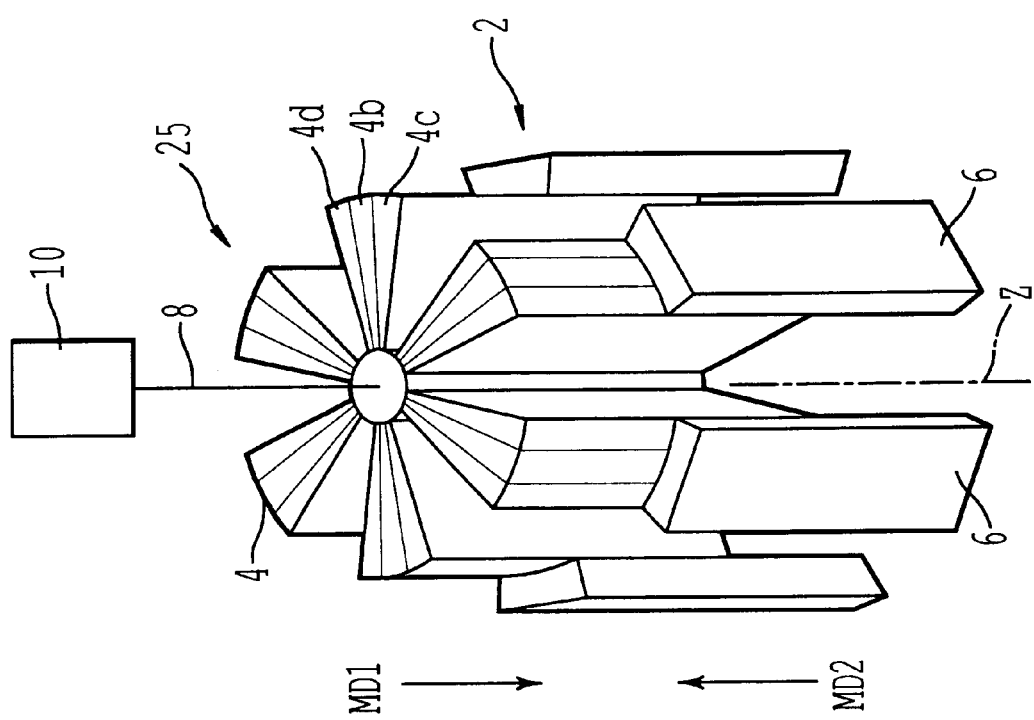
FIG. 15 is a perspective view of an impact generator according to another embodiment of the present invention.
Figure 16:
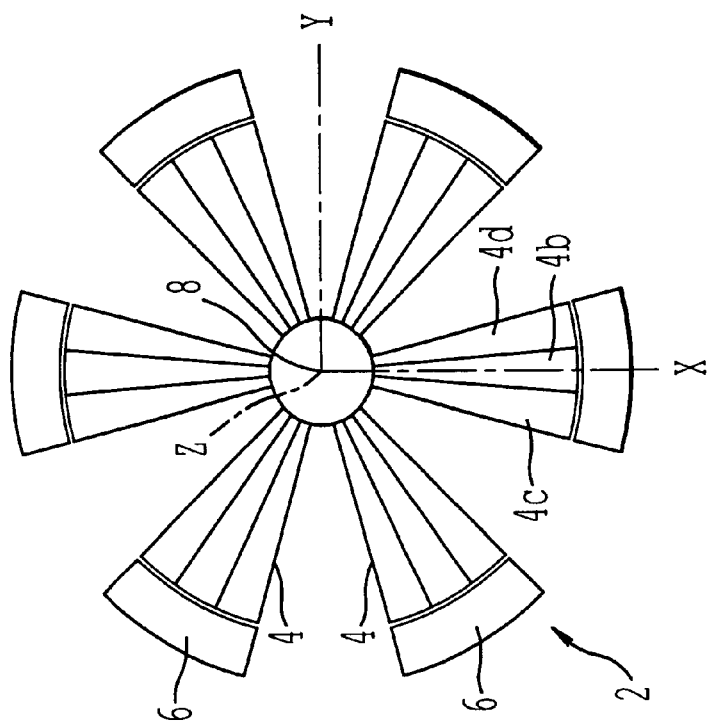
FIG. 16 is a top plan view of the impact generator shown in FIG. 15.

FIGS. 15 and 16 shows a magnetic impact device 25 according to yet another embodiment of the present invention. Referring to FIGS. 15 and 16, the impact generator 2 includes a plurality of hammers 4 and a plurality of chucks 6. The hammers 4 are, for example, similar to hammers shown in FIGS. 4 and 5. The hammers 4 are connected to a circumferential surface of the shaft 8, for example, with substantially equal angular space. The shaft 8 is connected to a linear motor 10 and linearly movable along the axis Z of the shaft 8. In FIGS. 15 and 16, the impact generator 2 includes, for example, six hammers 4.

The chucks 6 are provided to be coaxial with the hammers 4 and to be relatively linearly movable along the axis Z. The chucks 6 are provided around the shaft 8 facing the corresponding hammers 4, respectively. In FIGS. 15 and 16, the impact generator 2 includes, for example, six chucks 6. Although the number of the hammers 4 are the same as that of the chucks 6 in the present embodiment, these numbers may be different.

Referring to FIG. 15, when the hammers 4 are outside the chucks 6, the hammers 4 get attracted magnetically towards the chucks 6. The hammers 4 move in a first moving direction (MD1) along the axis Z. The hammers 4 go past the chucks 6 (the equilibrium point) and exerts a momentary attractive force on the chucks 6 in the first moving direction (MD1). This force is the linear impact force generated magnetically in a non-contact manner. Namely, magnetic energy stored while the hammers 4 are trying to escape the attraction of the chucks 6 is used to generate an impact to the chucks 6. Then, the hammers 4 moves in a second moving direction (MD2) opposite to the first moving direction (MD1) and the magnetic impact device 25 generates linear impact motion in the second moving direction (MD2). According to the present embodiment of the present invention, linear impact motion may be generated while the impact noise reduces.

In the above described embodiments, the permanent magnet is provided to the hammers 4. However, the permanent magnet may be provided to the chucks 6 and the magnetic material is provided to the hammers 4. Further, the permanent magnet may be provided to both the chucks 6 and the hammers 4.

In the above described embodiments, either rotational impact motion or linear impact motion is generated. However, a magnetic impact device generating the impact motion combining the rotational impact motion and the linear impact motion may be obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A magnetic impact device comprising:
    at least one chuck;
    at least one hammer relatively movable with respect to the at least one chuck, one of said at least one hammer and said at least one chuck having at least one magnet, another of said at least one hammer and said at least one chuck having at least one magnet or magnetic material; and
    a driving unit configured to move said at least one hammer relatively to said at least one chuck to magnetically generate impact motion of said at least one chuck.

2. A magnetic impact device according to claim 1, wherein the magnetic impact device includes a plurality of hammers and a plurality of chucks and wherein a number of said plurality of hammers and a number of said plurality of chucks are the same.

3. A magnetic impact device according to claim 1, wherein the magnetic impact device includes a plurality of hammers and a plurality of chucks and further comprises a shaft to which said plurality of hammers are radially connected, and wherein the plurality of chucks are provided corresponding to the plurality of hammers.

4. A magnetic impact device according to claim 3, wherein said plurality of hammers are radially connected to said shaft with substantially equal angle spaces, and wherein the plurality of chucks are provided along a circumference of said plurality of hammers with substantially equal angle spaces.

5. A magnetic impact device according to claim 1, wherein said at least one hammer comprises:
    at least one yoke which is made of magnetic material and to which said at least one magnet is provided.

6. A magnetic impact device according to claim 5, wherein the magnetic impact device includes first and second yokes which sandwiches said at least one magnet therebetween.

7. A magnetic impact device according to claim 1, wherein said at least one magnet is a permanent magnet.

8. A magnetic impact device according to claim 1, wherein said at least one hammer is connected to a shaft and wherein said driving unit is configured to rotate said at least one hammer around the shaft.

9. A magnetic impact device according to claim 8, wherein said at least one chuck has a frame shape inside of which said at least one hammer passes through.

10. A magnetic impact device according to claim 8, wherein said at least one hammer and said at least one chuck have a substantially fan-shaped cross section taken along a plane perpendicular to an axis of said shaft.

11. A magnetic impact device according to claim 10, wherein a central angle of the substantially fan-shaped cross section of said at least one hammer is substantially equal to a central angle of the substantially fan-shaped cross section of said at least one chuck.

12. A magnetic impact device according to claim 8, wherein said at least one hammer has a frame shape inside of which said at least one chuck passes through.

13. A magnetic impact device according to claim 8, wherein the magnetic impact device includes a plurality of hammers and a plurality of chucks and wherein angular spaces between the hammers are substantially equal and angular spaces between the chucks are substantially equal.

14. A magnetic impact device according to claim 13, wherein said angular spaces between the hammers and said angular spaces between the chucks are substantially equal.

15. A magnetic impact device according to claim 8, wherein the magnetic impact device includes a plurality of hammers and a plurality of chucks and wherein said hammers include the magnets whose magnetization direction is along a circumferential direction of the shaft such that N-poles and S-poles of the magnets are alternatively positioned around the shaft.

16. A magnetic impact device according to claim 8, wherein the magnetic impact device includes a plurality of hammers and a plurality of chucks and wherein a number of said plurality of hammers and a number of said plurality of chucks are determined based on a maximum energy variation and a target peak torque of the magnetic impact device.

17. A magnetic impact device according to claim 8, wherein said at least one hammer has a diameter which is determined to increase as a target torque increases.

18. A magnetic impact device according to claim 8, wherein the magnetic impact device includes a plurality of hammers and a plurality of chucks and wherein each of said hammers includes first and second magnets whose magnetization direction is along a radial direction of the shaft.

19. A magnetic impact device according to claim 8, further comprising:
    a cylindrical shaft in which the shaft is coaxially provided, said at least one hammer being connected to an outer circumferential surface of said cylindrical shaft; and
    a spring connecting said cylindrical shaft and the shaft.

20. A magnetic impact device according to claim 19, wherein said spring is configured to store motor energy which is substantially equal to a peak magnetic energy stored in the magnet.

21. A magnetic impact device according to claim 1, wherein said at least one hammer is connected to a shaft and wherein said driving unit is configured to move said at least one hammer linearly along an axis of the shaft.

22. A magnetic impact device according to claim 21, wherein the magnetic impact device includes a plurality of hammers and a plurality of chucks and wherein said plurality of chucks are provided to surround said plurality of hammers.

23. A magnetic impact device according to claim 22, wherein said plurality of chucks and said plurality of hammers are coaxially provided.

24. A magnetic impact device according to claim 21, wherein said at least one hammer has a substantially fan-shaped cross section taken along a plane perpendicular to an axis of said shaft.

25. A magnetic impact device according to claim 21, wherein the magnetic impact device includes a plurality of hammers and wherein angular spaces between the hammers are substantially equal.

26. A magnetic impact device according to claim 1, wherein an air gap between said at least one chuck and said at least one hammer is at most about 0.25 mm.

27. A magnetic impact device according to claim 1, wherein said magnetic material is made of a soft magnetic material.

28. A power tool comprising:
 a magnetic impact device comprising:
  at least one chuck;
  at least one hammer relatively movable with respect to the at least one chuck, one of said at least one hammer and said at least one chuck having at least one magnet, another of said at least one hammer and said at least one chuck having at least one magnet or magnetic material; and
  a driving unit configured to move said at least one hammer relatively to said at least one chuck to magnetically generate impact motion of said at least one chuck.

29. A magnetic impact device comprising:
 at least one chuck;
 at least one hammer relatively movable with respect to the at least one chuck, one of said at least one hammer and said at least one chuck having at least one magnet, another of said at least one hammer and said at least one chuck having at least one magnet or magnetic material; and
 driving means for moving said at least one hammer relatively to said at least one chuck to magnetically generate impact motion of said at least one chuck.

30. A method for magnetically generating impact motion, comprising:
 providing at least one chuck;
 providing at least one hammer;
 providing one of said at least one hammer and said at least one chuck with at least one magnet;
 providing another of said at least one hammer and said at least one chuck with at least one magnet or magnetic material; and
 moving said at least one hammer relatively to said at least one chuck to magnetically generate impact motion of said at least one chuck.

31. A method according to claim 30, wherein a plurality of hammers and a plurality of chucks are provided and wherein a number of said plurality of hammers and a number of said plurality of chucks are the same.

32. A method according to claim 30, wherein a plurality of hammers are radially connected to a shaft with substantially equal angle spaces, and wherein a plurality of chucks are provided along a circumference of said plurality of hammers with substantially equal angle spaces.

33. A method according to claim 30, wherein said at least one hammer includes at least one yoke which is made of magnetic material and to which said at least one magnet is provided.

34. A method according to claim 33, wherein first and second yokes sandwich said at least one magnet therebetween.

35. A method according to claim 30, wherein said at least one hammer is rotated around a shaft to which said at least one hammer is connected.

36. A method according to claim 35, wherein said at least one hammer and said at least one chuck have a substantially fan-shaped cross section taken along a plane perpendicular to an axis of said shaft.

37. A method according to claim 36, wherein a central angle of the substantially fan-shaped cross section of said at least one hammer is substantially equal to a central angle of the substantially fan-shaped cross section of said at least one chuck.

38. A method according to claim 35, wherein angular spaces between the hammers are substantially equal and angular spaces between the chucks are substantially equal.

39. A method according to claim 38, wherein said angular spaces between the hammers and said angular spaces between the chucks are substantially equal.

40. A method according to claim 35, wherein said hammers include the magnets whose magnetization direction is along a circumferential direction of the shaft and N-poles and S-poles of the magnets are alternatively positioned around the shaft.

41. A method according to claim 35, wherein a number of a plurality of hammers and a number of a plurality of chucks are determined based on a maximum energy variation and a target peak torque of the magnetic impact device.

42. A method according to claim 35, wherein a diameter of said at least one hammer is determined to increase as a target torque increases.

43. A method according to claim 35, wherein each of said at least one hammer includes first and second magnets whose magnetization direction is along a radial direction of the shaft.

44. A method according to claim 35, further comprising:
 coaxially providing the shaft in a cylindrical shaft;
 connecting said at least one hammer to an outer circumferential surface of said cylindrical shaft; and
 connecting said cylindrical shaft and the shaft via a spring.

45. A method according to claim 44, wherein said spring stores motor energy which is substantially equal to a peak magnetic energy stored in the magnet.

46. A method according to claim 30, wherein said at least one hammer is moved linearly along an axis of the shaft to which said at least one hammer is connected.

47. A method according to claim 46, wherein a plurality of chucks are provided to surround a plurality of hammers.

48. A method according to claim 47, wherein said plurality of chucks and said plurality of hammers are coaxially provided.

49. A method according to claim 46, wherein the magnetic impact device includes a plurality of hammers and wherein angular spaces between the hammers are substantially equal.

50. A method according to claim 30, wherein an air gap between said at least one chuck and said at least one hammer is at most about 0.25 mm.

51. A magnetic impact generator comprising:
 at least one chuck; and
 at least one hammer, one of said at least one hammer and said at least one chuck having at least one magnet, another of said at least one hammer and said at least one chuck having at least one magnet or magnetic material, said at least one hammer being configured to be moved relatively to said at least one chuck to magnetically generate impact motion of said at least one chuck.

* * * * *